United States Patent [19]

Rhodes

[11] Patent Number: 5,301,208
[45] Date of Patent: Apr. 5, 1994

[54] TRANSFORMER BUS COUPLER

[75] Inventor: Melvin H. Rhodes, Cedar Rapids, Iowa

[73] Assignee: The United States of America as represented by the Secretary of the Air Force, Washington, D.C.

[21] Appl. No.: 843,652

[22] Filed: Feb. 25, 1992

[51] Int. Cl.$^5$ .................................................. H04B 3/00
[52] U.S. Cl. ........................................ 375/36; 333/130; 333/131; 333/32
[58] Field of Search ............... 375/7, 36; 333/124, 333/130, 131, 136, 32, 118, 119

[56] References Cited

U.S. PATENT DOCUMENTS

| | | | |
|---|---|---|---|
| 2,148,098 | 2/1939 | Bowman-Manifold | 178/44 |
| 2,237,796 | 4/1941 | Smith | 178/44 |
| 3,983,323 | 9/1976 | Griffith et al. | 178/58 R |
| 4,443,662 | 4/1984 | Nakhla | 179/2 C |
| 4,507,793 | 3/1985 | Adams | 375/36 |
| 4,588,856 | 5/1986 | Cohen | 179/2 C |
| 5,073,762 | 12/1991 | Yu | 333/131 |
| 5,081,648 | 1/1992 | Herzog | 375/36 |

Primary Examiner—Stephen Chin
Assistant Examiner—Hai H. Phan
Attorney, Agent, or Firm—Donald J. Singer; William G. Auton

[57] ABSTRACT

A transformer bus coupler, which connects a transceiver to a data bus without impedance discontinuities. The transformer bus coupler maintains the voltage-to-current ratio of signals as they enter and leave the coupler by providing a shunt circuit that attenuates the current of these signals by the same ratio that the series elements of the coupler attenuate the voltage. The result is an avoidance of impedance discontinuities, which would otherwise result in the signal reflections and the loss of signal fidelity experienced by prior art data bus couplers.

4 Claims, 6 Drawing Sheets

TRANSFORMER BUS COUPLER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to local area networks of transceiver units interconnected by a data bus, and more specifically to a transformer bus coupler for connecting a transceiver to a data bus line.

Most data bus couplers which are presently in use are a source of discontinuities between the transceiver units and the data bus. These discontinuities occur because the impedance of each data bus coupler is commonly different from the characteristic impedance of the transmission line.

The task of effectively coupling remote equipment together in a local area network is alleviated, to some extent, by the coupling network disclosed in the following U.S. patents, the disclosures of which are incorporated by reference.

U.S. Pat. No. 2,148,098 issued to Bowman-Manifold;
U.S. Pat. No. 2,237,796 issued to Smith;
U.S. Pat. No. 3,983,323 issued to Griffith et al;
U.S. Pat. No. 4,443,662 issued to Nakhla;
U.S. Pat. No. 4,507,793 issued to Adams; and
U.S. Pat. No. 4,588,856 issued to Cohen.

The Nakhla patent shows a coupling network for coupling data signals to and from a telephone subscriber line. The network serves to couple data from a modem at the central office end of a line to the line for transmission to the subscriber end modem and also serves to couple data from the modem via the line to another modem in a full duplex manner.

Bowman-Manifold shows a high frequency transmission line with a receiver or branch line and series impedances both having a value $R_1/2$. By in effect forming a resistant T-network at a load tapping point the patent alleges that substantially no reflection is introduced at the tapping point.

Smith is directed to a mixer circuit in which a plurality of devices are connected to a pair of buses by a fixed attenuator having series and shunt impedances. Griffith et al are concerned with a balanced bridge, full duplex system for sending and receiving digital signals. Cohen and Adams both relate to digital signal transmission and reception of a common line.

While the systems described in the above-cited references are instructive, the need for connecting transceivers to data bus lines without impedance discontinuities remains. The present invention is intended to satisfy that need.

SUMMARY OF THE INVENTION

The present invention is a data bus coupler which electrically connects a transceiver to a data bus line without causing impedance discontinuities which result in signal reflections and losses in signal fidelity.

The principle of the present invention is as follows. When a signal is traveling on a path from a transmission line, through a bus coupler, and to a device the ratio of the voltage to a current leaving the bus coupler should have the same ratio as that entering the coupler.

By matching the impedance characteristics of the coupler with that of the transmission line, the resulting impedance continuity reduces signal reflections and the corresponding losses in signal fidelity that would otherwise occur.

The coupler system of the present invention electrically connects a transceiver to a data bus without causing the impedance discontinuities that accompany prior art coupler units. This coupler system has a coupler circuit which couples the transceiver to a data bus, and a shunt circuit which is electrically connected between the two lines of the data bus. The purpose of the shunt circuit is to attenuate the data bus current by the same ratio that the coupler circuit attenuates the voltage. The result of the use of this shunt is that the ratio of voltage-to-current which leaves the coupler will be the same as that entering the coupler. This allows the coupler to connect the transceiver to the data bus without the impedance discontinuities and loss of fidelity experienced by prior art electrical coupler systems.

The series circuit of the present invention electrically connects the transceiver to the data bus. In an example of this invention, the particular data bus used is a pair of 50 ohm coaxial cables.

The "transceiver" mentioned above is a convenient label which refers to any signal processing system that needs to receive data signals, and which produces transmitted signals. For the purpose of the present discussion, this transceiver has an output port, henceforth labeled a transmitter, and an input port henceforth labeled a receiver. One example of such a transceiver is a microprocessor which is connected with a digital-to-analog converter (DAC), which forms an output port; and an analog to digital (A/D) converter which forms its input port.

One embodiment of the coupler circuit includes two pairs of electrically coupled transformers, a pair of 75 ohm stubs, and a pair of isolation resistors. This coupler circuit electrically connects the transmitter and receiver to the pair of coaxial cables of the data bus in the manner discussed below.

The first pair of electrically coupled transformers electrically connects the transmitter and the receiver to the pair of 75 ohm stubs. Each of these stubs is connected to one of the second pair of transformers.

The second pair of transformers has a data bus side and a transceiver side. The windings of these transformers on their transceiver side are electrically connected to the 75 ohm stubs, as mentioned above. The windings of these transformers on their data bus side are electrically connected together in series, and are each connected with one of the coaxial cables of the data bus by an isolation resistor. This configuration allows the transceiver to transmit and receive data over the data bus.

The coupler circuit described above provides an electrical connection between the transceiver and data bus. In addition to the circuit elements described above, a pair of shunt resistors are electrically connected in parallel between the two coaxial cables of the data bus. These shunt resistors prevent the coupler system from exhibiting impedance discontinuities, with respect to the data bus, in the manner described below.

The principle of the present invention is as follows. When a signal passes between the transmission lines and the coupler, the ratio of voltage-to-current leaving the coupler should be the same as that entering the coupler. The coupler design of the present invention implements this principle by the design described above. The solution of maintaining the voltage-to-current ratio entails providing shunt elements with an admittance which attenuates the coupler current by the same ratio that the series impedance of the coupler attenuates the voltage. The coupler of the present invention thereby avoids the impedance discontinuities and the resulting signal reflections and loss of fidelity that are inherent characteristics of prior art electrical coupler units.

It is an object of the present invention to electrically connect transceivers to data bus transmission lines with a minimum loss of signal fidelity.

It is another object of the present invention to provide coupler connections with impedance continuity.

It is another object of the present invention to electrically connect transceivers into a local area network with minimum insertion losses.

These together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a transformer bus coupler for electrically connecting a transceiver to data bus transmission lines with minimal signal distortion, and low insertion losses.

Figure 1:
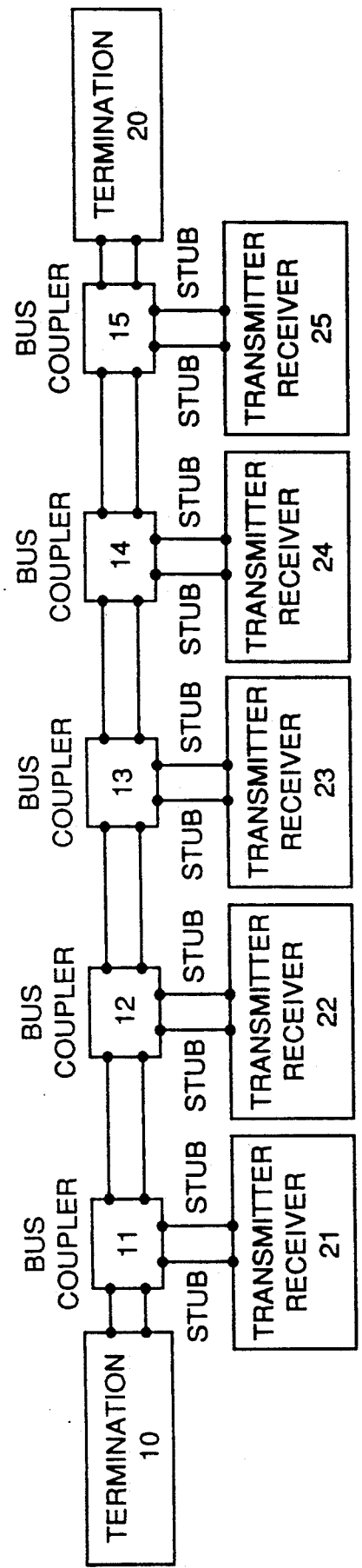
FIG. 1 is a digital network which can make use of the bus coupler design of the present invention.

The readers attention is now directed towards FIG. 1. which is a digital network which can make use of the bus coupler design of the present invention. The system of FIG. 1 uses five bus couplers 11-15 to interconnect five transmitter/receiver devices 21-25 onto a bus network which has two main termination points 10 and 20.

Figure 2:
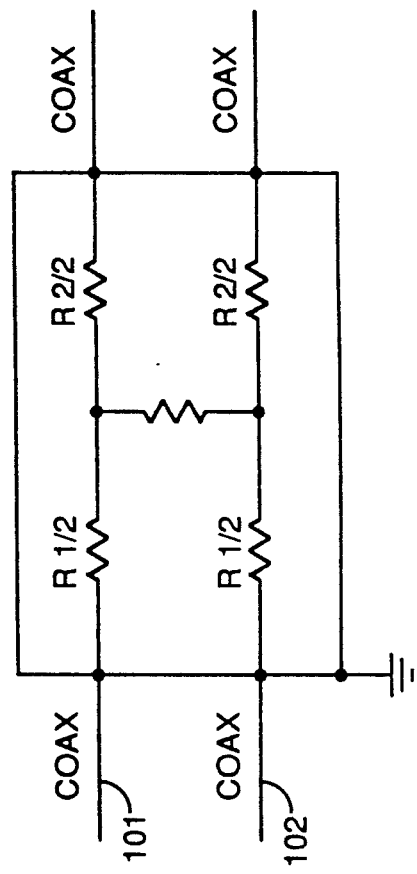
FIG. 2 is a schematic of a symetrical H attenuator used in a bus.
Figure 3:
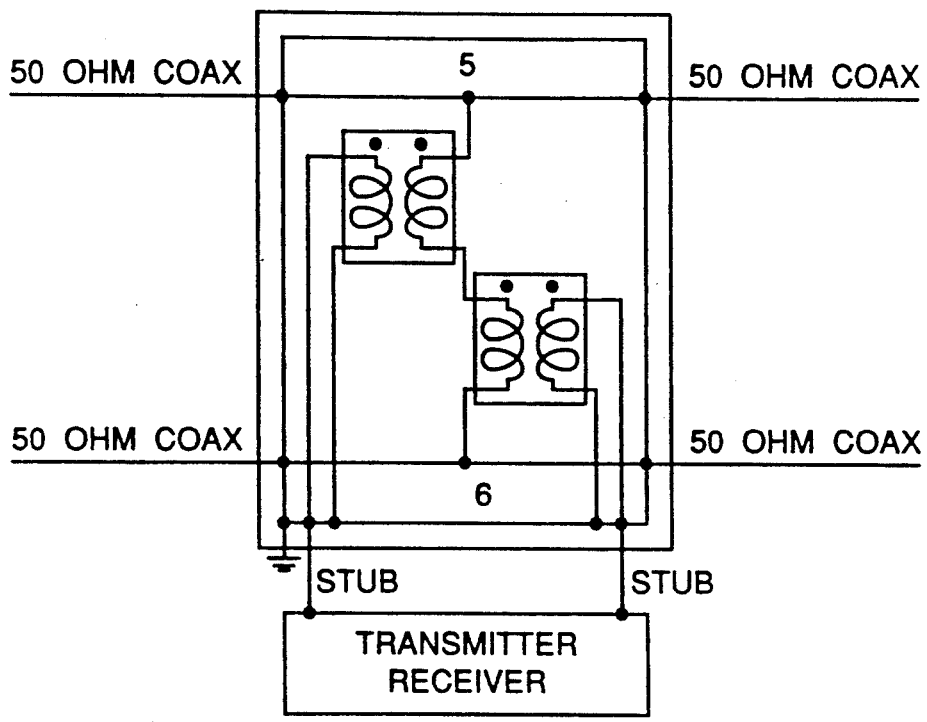
FIG. 3 is a schematic of a data bus coupler without series resistors.

The present invention is a bus coupler design which is intended to replace each of the bus couplers 11-15 in the system of FIG. 1. The main improvement of this coupler is to reduce the reflection caused by previous designs and to make it fault tolerant to a single failure in the bus coupler. Reflection on a digital bus can cause errors due to intersymbol interference. To reduce the reflections the bus coupler was designed to appear as a balanced symmetrical H attenuator to the balance digital transmission line bus. The schematic for a symmetrical balanced attenuator is shown in FIG. 2. FIG. 2 is explained in detail below in conjunction with the description of the operation of FIG. 8. To make the coupler fault tolerant two transformers are used in series across the bus as shown in FIG. 3.

The coupler should have the same characterisitc impedance as the transmission line to minimize signal reflections. When in the bus coupler is in the receive mode, the coupler should be designed to have the voltage to current ratio exiting the coupler to the transmission line be nearly equal to the voltage to current ratio entering the coupler from the transmission line. Also the voltage/current ratio should be equal to the characteristic impedance of the transmission line. If this condition is met the reflections caused by the bus coupler will be very low.

Figure 4:
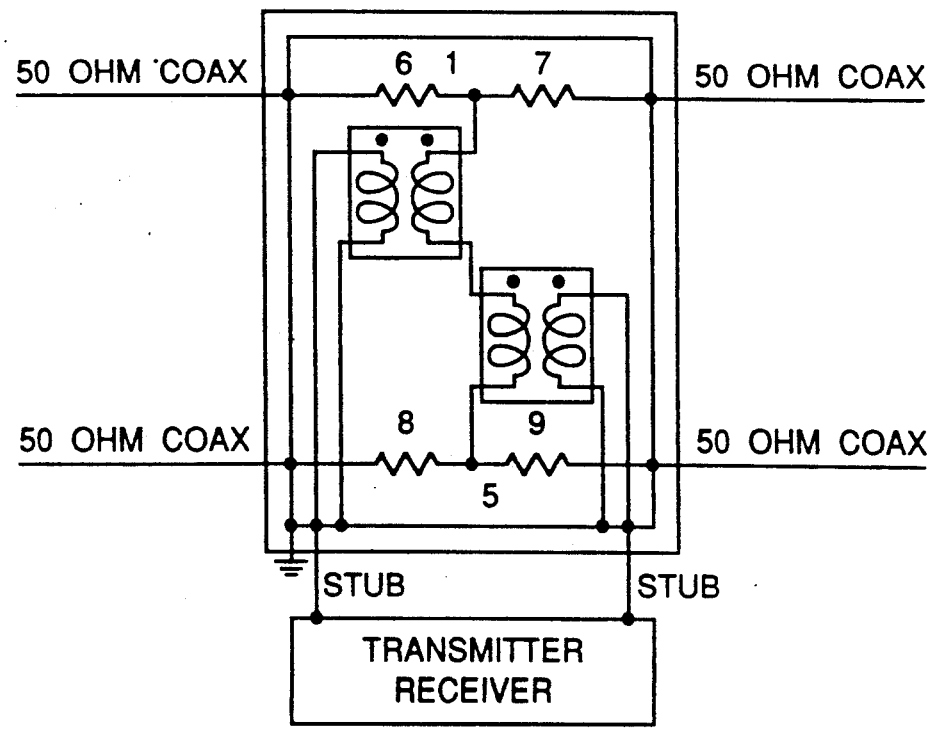
FIG. 4 is an illustration of a data bus coupler with series resistors.
Figure 5:
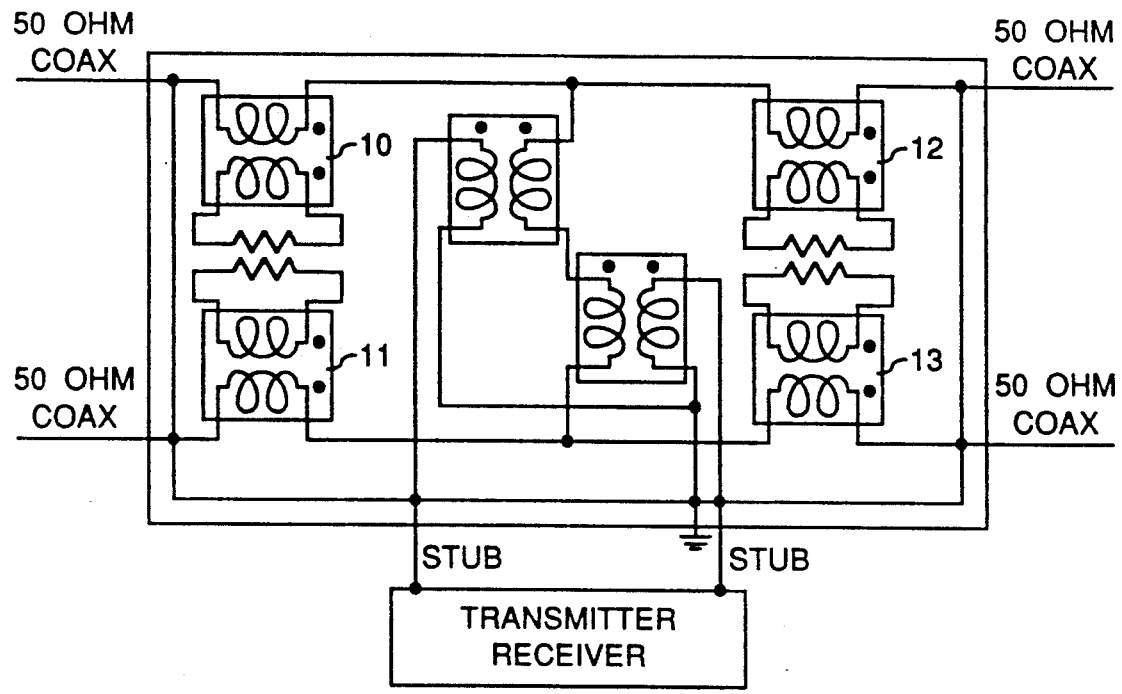
FIG. 5 and 6 are illustrations of the bus coupler of the present invention with transformers in the main bus lines.

To receive a signal from the bus a certain minimum power must be extracted from the transmission line. Since the part of the bus coupler circuit that drives the receiver is connected between 1 and 5 as shown in FIG. 3, it will only affect the Iout, (out current) to Iin(in current) ratio and not affect the Vout, (voltage out) to Vin, (voltage in) ratio. To affect the Vout to Vin ratio four resistors are added to the circuit as shown in FIG. 4 to make the coupler appear as a symmetrical balance H attenuator.

An example of a design follows The characteristic impedance of the transmission line will be 100 ohms if 50 ohm coax cable is used to for the bus. If the insertion loss in the transmission line is to 0.4 dB then the resistive impedance from 1 to 5 will be need to be 2170 ohms and the four resistors 6, 7, 8 and 9 will be 1.375 ohms. Since the two transformer primaries are in series then each should reflect 1085 ohms from each of the 75 ohm stub to the transmitter receivers. The transformer turns ratio will be 19:5. Both stubs are used for both receiving and transmitting. If one of the transformers shorted it could only cause the impedance between 1 and 5 to be a minimum of 1085 ohms. Either failure will degrade the transmission line but it not cause a total failure of the transmission bus.

Figure 6:
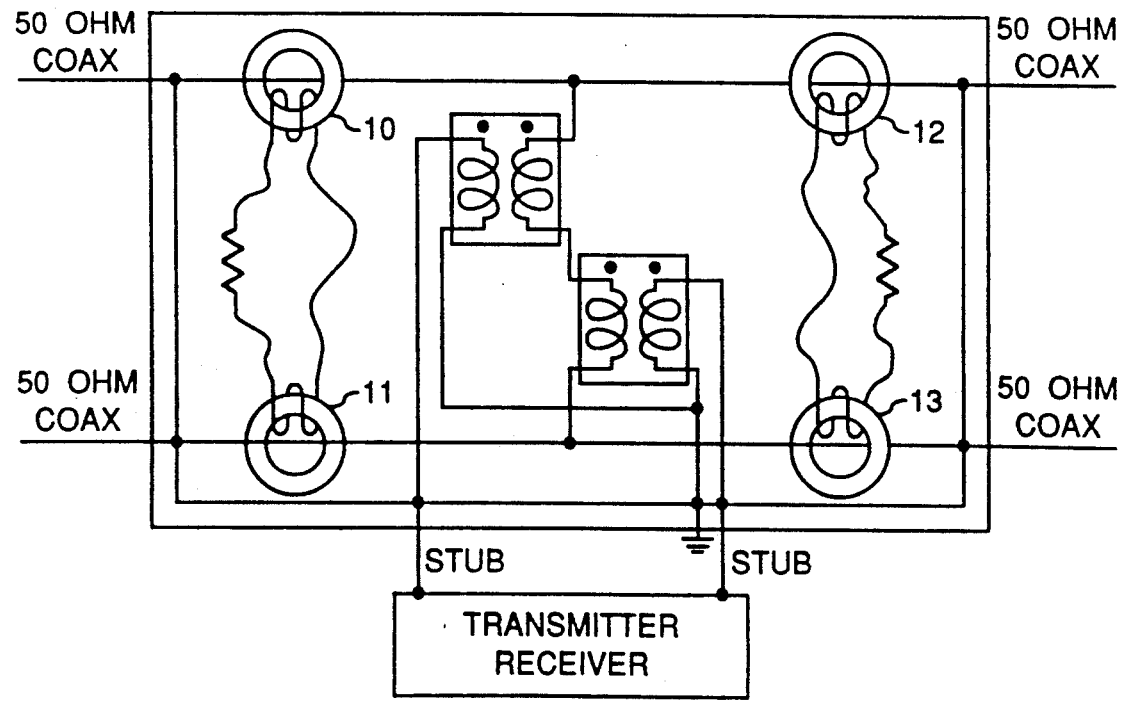

FIG. 6 shows a modification of the bus coupler to replace the four resistors with transformers that have a one turn primary and multiturn secondary with a resistive load. The primary for transformer is the main bus center conductor. If the secondary is 10 turns then the resistor will be 137.5 ohms.

Since Iin is the same for both transformers 10 and 11 then the secondaries may be put in series and a 275 ohm resistor may be used as shown in FIG. 6. The same would be true for transformers 12 and 13.

Figure 7:
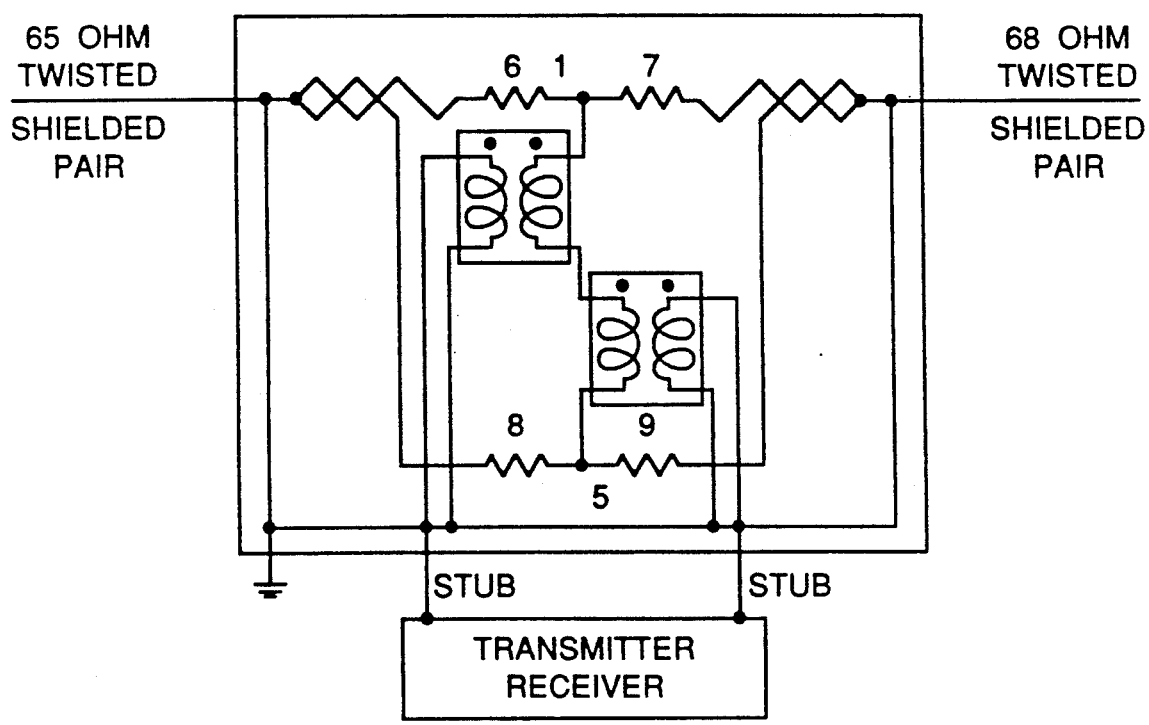
FIG. 7 is a schematic of a data bus coupler with a 68 ohm twisted shield bus.

FIG. 7 shows a bus coupler that could be used with a twisted shielded pair cable that is used for the bus. This is the same type cable as used with the 1553 bus. This bus coupler would greatly reduce the wave form distortion that occurs when using the standard 1553 bus coupler. It would have better fault tolerance.

Figure 8:
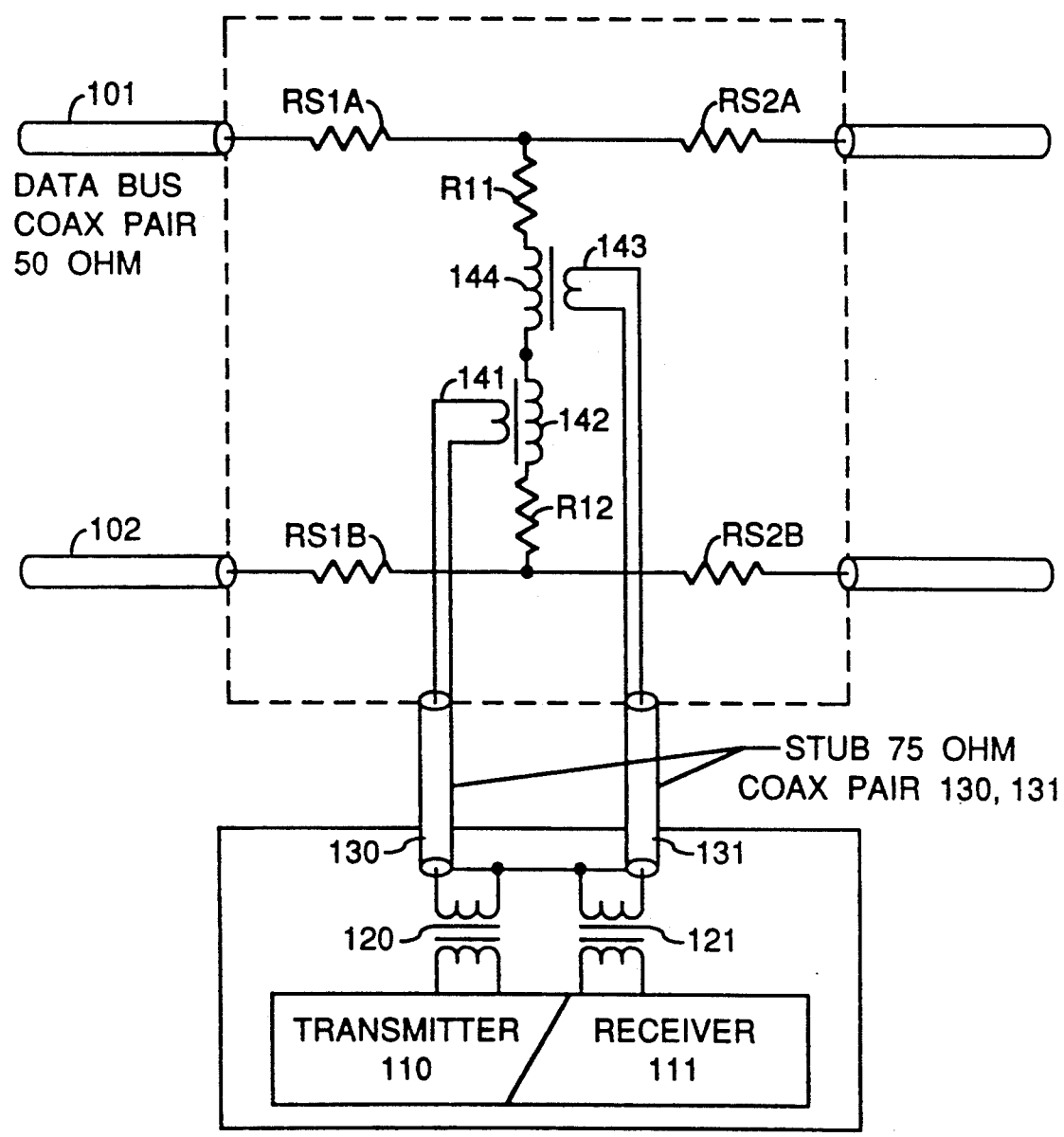
FIG. 8 is an electrical schematic of an embodiment for the present invention.

The reader's attention is now directed towards FIG. 8, which is an electrical schematic of an embodiment of the present invention. The coupler system of FIG. 8 electrically connects the transmitter 100 and receiver 111 to the transmission lines 101 and 102 of a data bus.

The coupler system of FIG. 8 is electrically connected to the transmitter and receiver by an interface circuit composed of a pair of coupled transformers 120 and 121, and a pair of 75 ohm stubs 130 and 131. The first transformer 120 receives signals produced by the transmitter, and provides them to the stubs. The second transformer 121 conducts received data signals into the receiver 110. Note that both transformers 120 and 121 are coupled together on their coupler side to conduct alternating current signals to and from the stubs 130 and 131.

The first and second stubs 130 and 131 of the interface circuit are respectively connected with a third and fourth electrically coupled transformers 141-144. For the purposes of a clear description, each of the third and fourth transformers 141-144 are described as having a transceiver side and a coupler side.

The third and fourth transformers 141-144 are each connected with one of the pair of 75 ohm stubs 130 and 131 on their transceiver side by their transceiver side windings 141-143.

The coupler side windings 142 and 144 of the third and fourth transformers are electrically connected together in a series circuit with each other. The isolation resistors $R_{I1}$ and $R_{I2}$ each electrically connect one of the transformers (on the coupler side) to one of the two transmission lines 101 and 102 that make up the data bus.

The coupler circuit described above provides an electrical connection between the transceiver 110 and 111 and the data bus 101 and 102. In addition to the circuit elements described above, a pair of shunt resistors $R_{S1}$ and $R_{S2}$ are electrically connected in parallel between the two transmission lines 101 and 102 of the data bus. These shunt resistors $R_{S1}$ and $R_{S2}$ prevent the coupler system from exhibiting impedance discontinuities, with respect to the data bus, in the manner described below.

The principle of the present invention is as follows. When a signal passes between the transmission lines of and the coupler, the ratio of voltage-to-current leaving the coupler should be the same as that entering the coupler. The coupler design of the present invention implements this principle by the design described above. The solution of maintaining the voltage-to-current ratio entails providing shunt elements with and admittance which attenuates the coupler current by the same ratio that the series impedance of the coupler attenuates the voltage. The coupler of the present invention thereby avoids the impedance discontinuities and the resulting signal reflections and loss of fidelity that are inherent characteristics of prior are electrical coupler units.

The principle of the present invention is implemented by a transformer coupler design which will maintain the ratio of voltage-to-current in the electrical signals that enter the coupler. The coupler of the present invention, as mentioned above, is designed so that the series impedance attenuates voltage by the same ratio as the shunt admittance attenuates the current. The ratio of the voltage leaving the coupler will be less than the voltage entering the coupler which will determine the loss through the coupler. Therefore, the system of FIG. 8 includes the four series resistors RS1A, RS2A, RS1B and RS2B which are in series with the transmission lines. Collectively, these series resistors are intended to provide the impedance which attenuates the coupler voltage by the same ratio that the shunt admittance of the coupler attenuates the current.

The transformer bus coupler, as described above, has comparatively lower insertion loss characteristics compared to prior art coupler systems. Insertion loss may be defined as signal-power loss resulting from connecting communication equipment with dissimilar impedance values. Since the present invention is designed to avoid impedance discontinuities between the coupler and the transmission lines, the present invention also minimized insertion losses.

In the system of the FIG. 8, the two transformers 142 and 144 appear as a resistive load which is shunted by a capacitor (which is caused by stray capacitances). In designing a circuit to satisfy the intentions of the invention, it is recommended that the value of the stray capacitances be determined empirically. Once this value is known, the admittance of the transformers will include a factor defined by $j\omega C$, where C is the capacitance. Since the susceptance of an inductor is represented as $1/j\omega L$, the transformers are selected so that their impedance counters that of the stray capacitances.

In addition to the dynamic impedance of the transformers (which varies with j), all of the transformers 120, 121 and 141-144 along with the isolation resistors $R_{I1}$ and $R_{I2}$ have a combined static impedance that appears as a resistive load between the transceiver components 110 and 111 and the two coaxial cables 101 and 102 of the data bus. As discussed above, the principle of the present invention is implemented by the addition of the series resistors RS1A, RS1B, RS2A and RS2B which have an acceptance which attenuates the voltage by the same proportion that the series impedance attenuates the current. This is best understood by the circuit of FIG. 9.

FIG. 2, which was mentioned above is a schematic of a circuit which is electrically equivalent to the static impedances of the transformer bus coupler circuit of FIG. 8. In FIG. 2, $R_3$ represents the combined impedance of all of the transformers 120, 121 and 141-144, the two 75 ohm stubs 130 and 131, and the isolation resistors $R_{I1}$ and $R_{I2}$, as they collectively connect the transceiver elements 110 and 111 between the two transmission lines 101 and 102 of the data bus.

If each series resistor RS1A, RS1B, RS2A and RS2B has a series impedance of $R_1/2$, then it has an electrically equivalent impedance of the $R_1/2$ which is connected to the data bus lines 101 and 102 as depicted in FIG. 2. This is because the series impedances are each connected in parallel with each other, and two parallel impedances (each of value $R_1$) are known to produce the single equivalent impedance of $R_1/2$.

The data bus coupler of the present invention is designed to have a characteristic impedance the same as the transmission line. It has a shunt impedance $R_3$ as well as the series impedances $R_1/2$. Tables 1 and 2 are intended to depict the appropriate shunt values for various series load examples for $R_3$. Table 1 defines these values when the transmission lines 101 and 102 of the data bus are 150 ohm lines. Table 2 defines these values when 50 ohm transmission lines are used.

TABLE 1

| 150 ohm Line | | |
|---|---|---|
| ATTENUATION (db) | $R_1/2$ (Kohms) | R3 (ohms) |
| 0 | 0.0 | |
| 0.1 | 0.375 | 13020 |
| 0.2 | 0.87 | 6510 |
| 0.3 | 1.30 | 4269 |
| 0.4 | 1.725 | 3255 |

TABLE 2

| 50 ohm Line | | |
|---|---|---|
| ATTENUATION (db) | $R_1/2$ (Kohms) | R3 (ohms) |
| 0 | 0.0 | |
| 0.1 | 0.29 | 4340 |
| 0.2 | 0.58 | 2170 |

TABLE 2-continued

| 50 ohm Line | | |
|---|---|---|
| ATTENUATION (db) | $R_1/2$ (Kohms) | $R_3$ (ohms) |
| 0.3 | 0.87 | 1423 |
| 0.4 | 1.15 | 1085 |

As mentioned above, it is recommended that the shunt impedances values of $R_3$ be determined by measurement. The value of $R_3$ in FIG. 2 represents the combined static impedance of: all of the transformers 120, 121 and 141-144, the isolation resistors $R_{I1}$ and $R_{I2}$, and the 75 ohm stubs 130 and 131 of FIG. 1.

Once $R_3$ has been determined, the series resistors are connected as depicted in FIG. 8. By following the values indicated in Tables 1 and 2, the series (each of value $R_1$) will attenuate the voltage on the transmission line by the same proportion that the shunt admittance of the coupler circuit attenuates the current. These series resistors thereby make the data bus coupler of FIG. 8 look like a distortionless attenuator.

Figure 9:
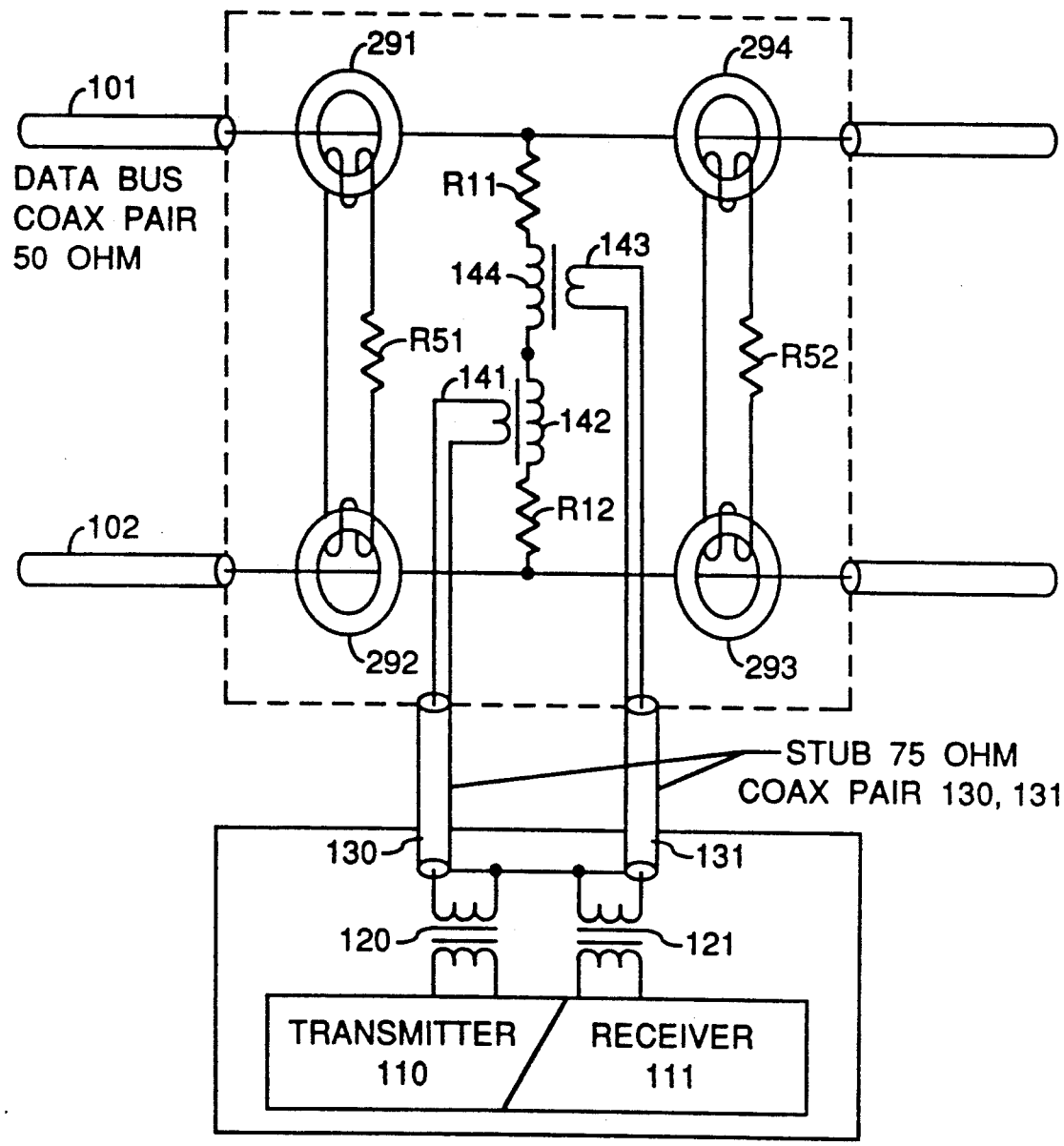
FIG. 9 depicts another embodiment of the present invention.

FIG. 9 is a schematic of another embodiment of the present invention. All of the components of the system of FIG. 9 are identical to like enumerated components in FIG. 8. The difference between the system of FIG. 9 and that of FIG. 1 is that the system of FIG. 9 connects the series resistors RS1A, RS1B, RS2A and RS2B to the data bus lines 101 and 102 with four inductance couplers 291-294, which are schematically illustrated in FIG. 9. There inductance couplers are commercially available components and are known as "Toroid Transformers". When they are used, their impedance values must be added with that of each isolation resistor to produce the $R_1$ impedance sums that each series circuit has.

Typical values of the series impedance of $R_3$ (as depicted in FIG. 9) is about 1 K ohms. The isolation resistors in $R_{I1}$ and $R_{I2}$ are each about 100 ohms. Therefore the combined series impedance RS1A, RS1B, RS2A, RS2B of each seriesshould be between 2 and 3 K ohms (as indicated in Tables 2 and 3) where RS1A, RS1B, RS2A and RS2B each have an impedance value of $R_{1/2}$.

In conclusion, it is observed that a good bus coupler should have low insertion loss and it should not cause discontinuities in the characteristic impedance of the line such that reflections occur, causing a loss in fidelity.

It would be preferred that the bus coupler in the receive mode would look like a low loss resistive attenuator as shown in FIG. 9. Just enough power would be taken from the line to drive the bus receiver.

Most present data bus couplers in use cause discontinuities in the transmission bus because they do not present the characteristic impedance to the transmission line during the receive mode. When a signal is traveling down a transmission line the ratio of the voltage to current leaving the bus coupler should have the same ratio as the voltage entering the coupler. If this is true then the coupler will not cause a reflection on the transmission bus. The present invention solves this problem with the use of a shunt circuit combined with the series impedance of a bus coupler, so that the series impedance attenuates voltage by the same ratio as the shunt admittance attenuates the current. These impedances are of a value to make the coupler look like a distortionless attenuator.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A transformer bus coupler for electrically connecting a transceiver to a data bus in which said data bus has first and second transmission lines, said transceiver having a transmitter which produces data signals with a data signal voltage and a data signal current, and a receiver which receives said data signals, said transformer bus coupler having an electrical admittance which attenuates the data signal current by a first proportion and an adjusted bus coupler impedance which attenuates the data signal voltage by a second proportion that approximately equals the first proportion, said transformer bus coupler therefore maintaining a voltage-to-current ratio in said data signals, said transformer bus coupler having the impedance and the electrical admittance and comprising:
   a transformer circuit which electrically connects the first and second transmission lines to conduct said data signals therebetween, said transformer circuit having said electrical admittance which attenuates the data signal current; and
   a means for adjusting electrical impedance between said first and second transmission line so that said transformer bus coupler has an adjusted bus coupler impedance which attenuates the data signal voltage by a second proportion that approximately equals the first proportion, said transformer bus coupler therefore maintaining a voltage-to-current ratio in said data signals, and wherein said transformer circuit comprises:
   first and second transformers which have windings on their transceiver side and their coupler side, said first transformer being electrically connected with said transmitter with its windings on its transceiver side and receiving said data signals therefrom, said second transformer being electrically connected with said receiver with its windings on its transceiver side, said first and second transformers being coupled together with their windings on their coupler side;
   third and fourth transformers which have windings on their transceiver side and on their coupler side, and said third and fourth transformers having their transceiver side windings connected with the coupler side windings of the first and second transformers, said third and fourth transformers having their windings on the coupler side electrically connected in a series; and
   a means for connecting the windings on the coupler side of the third and fourth transformers to said first and second transmission lines and fourth transformers to said first and second transmission lines of said data bus to enable said third transformer to output said data signals onto said data bus, and to enable said fourth transformer to receive data signals from said data bus for said receiver.

2. A transformer bus coupler, as defined in claim 1, wherein said means for adjusting comprises:
   a series circuit which is electrically connected between said first and second transmission lines so that the series circuit is in a parallel circuit with said means for connecting and the windings on the coupler side of said third and fourth transformers, said series circuit reducing any impedance discontinuities in said transformer bus coupler by having an impedance which maintains a voltage-to-current ratio between all data signals which pass between said data bus and said transformer bus coupler, said voltage-to-current ratio being maintained as said impedance of series circuit attenuates said data signal voltage by a same proportion as said data signal current is attenuated by said electrical admittance of said transformer bus coupler.

3. A transformer bus coupler, as defined in claim 2, wherein said series circuit comprises:

first and second series resistors which are electrically connected in a series circuit with each other in said first transmission line of said data bus, said first and second series resistors collectively providing a first series impedance; and a third and fourth series resistors which are electrically connected in a series circuit with each other between said second transmission line of said data bus, said third and fourth series resistors collectively providing a second series impedance which combines with said first series impedance to form said adjusted bus coupler impedance to thereby attenuate said data signal voltage by the same proportion that the data signal current is attenuated by the electrical admittance of the transformer bus coupler.

4. A transformer bus coupler for electrically connecting a transceiver to a data bus in which has first and second transmission lines, said transceiver having a transmitter which produces data signals with a data signal voltage and a data signal current and a receiver which receives said data signals, said transformers bus coupler having an electrical admittance which attenuates the data signal current by a first proportion and an adjusted bus coupler impedance which attenuates the data signal voltage by a second proportion that approximately equals the first proportion, said transformer bus coupler therefore maintaining a voltage-to-current ratio in said data signals, said transformer bus coupler comprising:

first and second transformers which have windings on their transceiver side and their coupler side, said first transformer being electrically connected with said transmitter with its windings on its transceiver side and receiving said data signals therefrom, said second transformer being electrically connected with said receiver with its windings on its transceiver side, said first and second transformers being coupled together with their windings on their coupler side;

third and fourth transformers which have windings on their transceiver side and on their coupler side, and said windings on said transceiver side of said third and fourth transformers being respectively connected with the coupler side windings of the first and second transformers, said third and fourth transformers having their windings on their coupler side electrically connected in a series;

first and second isolation resistors which respectively connect the coupler side windings of the third and fourth transformers to said first and second transmission lines of said data bus to enable said third transformer to output said data signals onto said data bus, and to enable said fourth transformer to receive data signals from said data bus for said receiver;

first and second series resistors which are electrically connected in a series circuit with each other in said first transmission line of said data bus, said first and second series resistors collectively providing a first series impedance that attenuates said data signal voltage of said data signals by the same proportion that the data signal current is attenuated by the admittance of the transformer bus coupler; and third and fourth series resistors which are electrically connected in a series circuit with each other between said second transmission line of said data bus, said third and fourth series resistors collectively providing a second series impedance which combines with said first series impedance to form said adjusted bus coupler impedance to thereby attenuate said data signal voltage by the same proportion that the data signal current is attenuated by the electrical admittance of the transformer bus coupler.

* * * * *